Dec. 30, 1941.   W. P. COX   2,267,708
ROLLER BEARING AND CAGE
Filed Nov. 22, 1940
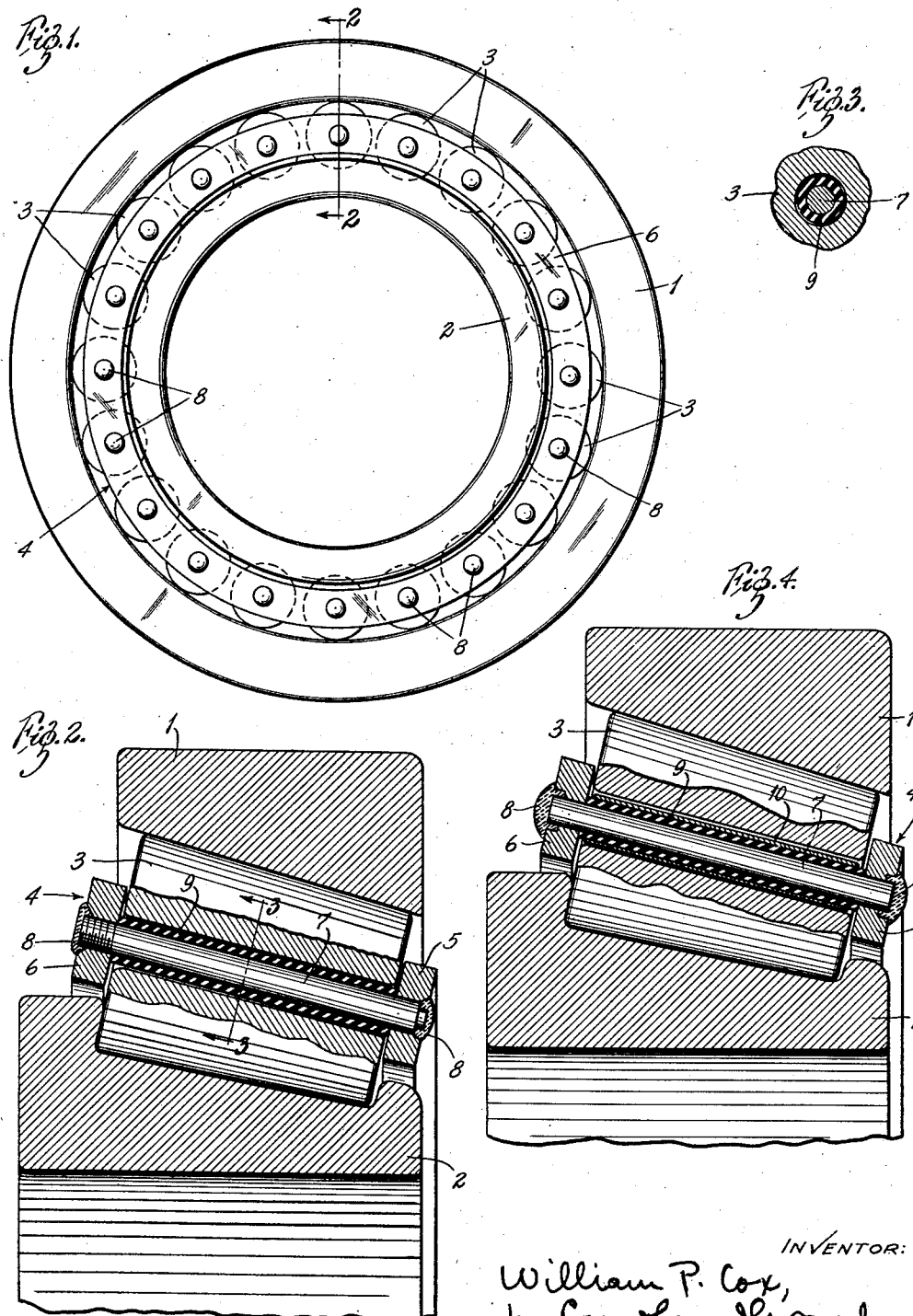
INVENTOR:
William P. Cox,
by Carr Carr & Gravely,
HIS ATTORNEYS.

Patented Dec. 30, 1941

2,267,708

UNITED STATES PATENT OFFICE 2,267,708

ROLLER BEARING AND CAGE

William P. Cox, Canton, Ohio, assignor to The Timken Roller Bearing Company, Canton, Ohio, a corporation of Ohio Application November 22, 1940, Serial No. 366,612

9 Claims. (Cl. 308—218)

My invention relates to roller bearings and cages of the type wherein the rollers have axial bores and the cage comprises pins extending through said bores and secured to end rings.

The invention has for its principal objects to minimize the noise of such bearings in operation and to increase the life of the cage by minimizing the tendency of the pins to wear loose in the end rings. The invention consists principally in placing sleeves of resilient material on said pins. The invention further consists in the roller bearing and cage and in the parts and combinations and arrangements of parts hereinafter described and claimed.

In the accompanying drawing, Fig. 1 is an end view of a roller bearing and cage embodying my invention, Fig. 2 is a sectional view on the line 2—2 in Fig. 1, Fig. 3 is a fragmentary cross sectional view on the line 3—3 in Fig. 2; and Fig. 4 is a sectional view, similar to Fig. 2, showing a modification.

In the drawing is illustrated a roller bearing and cage of the large or heavy duty type, including a cup 1 or outer bearing member, a cone 2 or inner bearing member, taper rollers 3 having axial bores, interposed between said bearing members and a cage indicated generally by 4, said cage including a small end ring 5, a large end ring 6 and cage pins 7 extending through the bores of the rollers 3 and secured to the end rings, as by welds 8. As thus described, the bearing and cage are of a well known heavy duty type, used in such applications as rolling mills, railway trucks and other installations where the bearings are heavily loaded.

In bearings of this type, there is some noise due to the repeated sharp impact of rollers against pins and, in some cases, there is a tendency of the pins 7 to wear loose in the end rings, special precautions being required to firmly secure the pins in place. These characteristics are largely due to the continual loading and unloading of individual rollers 3 as they enter the load zone, the rollers engaging the pins 7 with a hammer action that creates a clicking noise and that tends to loosen the pins in the end rings.

According to the present invention, the pins 7 are covered with a sleeve 9 of rubber or other resilient material, extending substantially the length of the rollers 3. Thus the impact of the rollers against the pins is cushioned and deadened by the rubber sleeve 9, with the result that the tendency of the pins to loosen is greatly reduced and the noise of the bearing in operation is likewise reduced.

In the modification shown in Fig. 4, each resilient sleeve 9 is protected by a metal casing 10 or covering of other suitable material. This avoids excessive wear on the rubber sleeves 9 and still minimizes the shock on the pins 7. This form of the invention likewise makes an appreciable reduction in bearing noise due to the resilient backing of the casings 10.

Obviously numerous changes may be made, particularly in the means connecting the cage pins and the end rings, without departing from my invention and I do not wish to be limited to the precise construction as shown.

What I claim is:

1. A cage for roller bearings having spaced rollers with axial bores, said cage comprising end rings, pins connecting said end rings and sleeves of resilient material on said pins, said pins constituting the sole means for connecting said end rings.

2. A cage for roller bearings having rollers with axial bores, said cage comprising end rings, pins connecting said end rings, sleeves of resilient material on said pins and protective covers on said sleeves.

3. A cage for roller bearings having rollers with axial bores, said cage comprising end rings, pins connecting said end rings, sleeves of resilient material on said pins, and metal casings on said resilient sleeves.

4. A cage for roller bearings having rollers with axial bores, said cage comprising end rings, pins connecting said end rings, sleeves of resilient material on said pins, and casings on said resilient sleeves.

5. A cage for roller bearings having rollers with axial bores, said cage comprising end rings, pins connecting said end rings, sleeves of resilient material on said pins, and casings of harder material on said resilient sleeves.

6. A roller bearing comprising an inner bearing member, an outer bearing member, spaced bearing rollers therebetween having axial bores, and a cage for said rollers comprising end rings, pins extending through the bores of said rollers and secured to said end rings and resilient sleeves on said pins, said pins constituting the sole means for connecting said end rings.

7. A roller bearing comprising an inner bearing member, an outer bearing member, bearing rollers therebetween having axial bores, and a cage for said rollers comprising end rings, pins extending through the bores of said rollers and secured to said end rings resilient sleeves on said pins, and metal casings on said resilient sleeves.

8. A roller bearing comprising an inner bearing member, an outer bearing member, bearing rollers therebetween having axial bores, and a cage for said rollers comprising end rings, pins extending through the bores of said rollers and secured to said end rings resilient sleeves on said pins, and casings on said resilient sleeves.

9. A roller bearing comprising an inner bearing member, an outer bearing member, bearing rollers therebetween having axial bores, and a cage for said rollers comprising end rings, pins extending through the bores of said rollers and secured to said end rings resilient sleeves on said pins, and casings of harder material on said resilient sleeves.

WILLIAM P. COX.